United States Patent Office 3,168,587
Patented Feb. 2, 1965

3,168,587
METHOD OF DEHYDROGENATION
Glenn O. Michaels, Park Forest, and James W. Gambell, South Holland, Ill., assignors to Sinclair Research, Inc., Wilmington, Del., a corporation of Delaware
No Drawing. Filed Apr. 27, 1962, Ser. No. 190,800
6 Claims. (Cl. 260—683.3)

Our invention relates to a method for the catalytic dehydrogenation of hydrocarbons.

The catalytic dehydrogenation of hydrocarbons is an operation which is carried out on a very large scale in the art. For example, normal butane is dehydrogenated to form butenes, normal butane and butenes are dehydrogenated to form butadiene, isoamylenes are dehydrogenated to form isoprene and ethyl benzene is dehydrogenated to form styrene. Among the catalysts which are used in the art in the dehydrogenation of hydrocarbons are Standard Oil Development Company 1707 which is a combination of magnesium oxide, ferric oxide, chromium oxide and potassium oxide, and Dow Type B which is a combination of nickel calcium phosphate and chromium oxide. The catalysts which are used for the dehydrogenation of hydrocarbons normally exhibit very rapid aging, thus making it necessary to regenerate the catalysts at frequent intervals. The rapid aging is due to the fact that the catalysts are operated at very high temperatures in the absence of high partial pressures of hydrogen. The technique generally used to improve catalyst life is to add large quantities of steam to the reactor system. The steam tends to suppress the coking reaction and also facilitates the removal of carbon from the catalyst through the water-gas reaction. An inert gas, such as carbon dioxide or nitrogen, can also be introduced into the reaction system to asist the dehydrogenation reaction, since this in effect decreases the hydrogen partial presure. Operation of the system at low pressures also tends to aid the removal of hydrogen from the material which it is desired to dehydrogenate. Catalysts which have as their active component a platinum group metal, for example, platinum, palladium, or rhodium, have high dehydrogenation activity and selectivity. When used for the purpose of dehydrogenating hydrocarbons, the platinum group metal should be on a support which is relatively non-acidic.

Although the supported platinum group metal catalysts are characterized by high activity and selectivity, they are especially sensitive to deactivation by coke. This sensitivity to coke is probably due to the fact that only small amounts of the platinum group metal (for example, from about 0.25 to 2 weight percent) are usually present in this type of catalyst. Due to their tendency to be deactivated by coke, the supported platinum group metal catalysts can lose almost all of their dehydrogenating activity in a matter of minutes. Hence, although their selectivity is excellent, the need for frequent regenerations has prevented their use.

We have now discovered that the activity of the aforementioned catalysts can be maintained by conducting the dehydrogenation of the hydrocarbon feed in the presence of certain specified amounts of oxygen. In accordance with the method of the present invention the hydrocarbon feed to be dehydrogenated is passed in the vapor phase together with about 0.01 to 10 mole percent of molecular oxygen, preferably about 1 to 5 mole percent, through a reaction zone maintained under dehydrogenation conditions and containing a catalyst consisting essentially of a catalytic amount of a platinum group metal on a non-acidic solid support.

The process of the present invention can be employed for the dehydrogenation of various types of dehydrogenateable aliphatic, including cycloaphatic, hydrocarbons, for instance up to 18 or more carbon atoms which may be cracked during the process. Suitable paraffins include for example, branched or straight chain paraffins of about 4 to 8 carbon atoms, cyclic paraffins such as cyclopentane or cyclohexane and cycloparaffins having an aliphatic side chain that can undergo dehydrogenation as, for instance, ethylcyclohexane to styrene. Aromatics containing aliphatic constituents such as n-propyl, isobutyl, n-butyl groups are also suitable for this method. In effect these materials can be considered to be aromatic substituted aliphatic hydrocarbons. The method of the present invention, however, is principally of value in the dehydrogenation of branched, straight chain or cyclic olefins containing about 4 to 8 carbon atoms and which undergo dehydrogenation to diolefins or aromatics. The method is particularly useful in the production of butadiene and/or isoprene from the dehydrogenation of normal butylenes and isoamylenes. In all cases unless the olefin feed contains eight or more carbon atoms, the carbon atoms of the feed should be non-quaternary (i.e. the feed will not contain a quaternary carbon atom).

The oxygen employed in accordance with the method of the present invention can be supplied as pure oxygen, air, or in the form of hydrogen peroxide or other combined form which will provide free or molecular oxygen during the reaction. The concentration of oxygen should be carefully controlled in order to prevent explosions or undue hydrocarbon burning. Thus, when using pure oxygen or air, it is preferred to dilute it with an inert or substantially inert diluent such as nitrogen, steam, etc. The proper oxygen level to maintain the desired cycle time will vary with the feedstock and the temperature, pressure and space velocity in the reactor, but will generally fall within the aforementioned range of about 0.01 to 10 mole percent of total process stream. The diluent to oxygen molar ratios employed are often about 10 to 20 or 40 or more moles of diluent gas per mole of molecular oxygen.

The reaction of the present invention can be conducted under conventional dehydrogenation conditions, the exact set of conditions being dependent on the feedstock and product desired. Generally, however, the temperature will be about 800 to 1300° F., preferably about 900 to 1200° F., the pressure about 0.05 to 100 p.s.i.g., preferably about 0.1 to 15, the weight hourly space velocity (WHSV) about 0.01 to 100, preferably about 0.1 to 10. The reaction may be carried out at reduced pressures or in the presence of any inert diluent gas such as nitrogen, methane, etc. to reduce the partial pressure of the feed to below atmospheric.

As previously mentioned, the catalyst of the present invention consists essentially of a catalytic amount of a platinum group metal supported on a non-acidic support, preferably silica. Suitable silica supports are those of the solid, non-acidic refractory metal oxide type and can be natural silica bases such as the silicates and mixtures of silicates or synthetic silicas such as mixtures of hydrous oxides of silicon with one or more of the oxides of magnesium, boron, aluminum, titanium or zirconium, treated if necessary with sufficient alkali to destroy whatever acidity the oxides have contributed. Other non-acidic metal oxide-type supports suitable for the present invention are, for example, zinc aluminate, magnesium aluminate and acidic supports such as alumina to which has been added sufficient alkali to destroy the acidity of the support. Acidic supports are unsuitable for use in the present invention since they cause undesirable isomerization or hydrocarbon cracking.

The catalytic amounts of platinum group metal can be dispersed on or composited with the non-acidic base in any conventional manner, for example, by impregnating it with a suitable solution of the platinum group metal salt followed by drying and calcining to convert the salt to the oxide. The catalyst is employed in the activated or calcined state. Preferably, the catalytic metal can be added through reaction of a halogen acid of the platinum group metal and hydrogen sulfide in an aqueous slurry of hydrous silicon oxide, drying and calcining to provide the catalytic metal as a sulfide. Promoters, other than the platinum group metals, may also be added, if desired.

The gaseous mixture issuing from the reaction zone may be quenched but this is normally unnecessary. The effluent is preferably cooled as by indirect heat exchange with the feed and then washed with dilute caustic to neutralize the traces of organic acid present and condense and remove steam if such is utilized. If air is used to supply the oxygen the remaining mixture is preferably compressed and scrubbed with oil to separate the hydrocarbons from nitrogen, carbon dioxide and carbon monoxide. The desired hydrocarbon may be recovered from the mixture in any known manner.

The following example is included to further illustrate the present invention.

EXAMPLE 10 grams of a 0.44% Pd on $SiO_2$ catalyst was charged to a semi-micro reactor maintained under the conditions shown in Table I. 2-methyl-2-butene together with 2.9 mole percent $O_2$ and nitrogen (as a diluent) was introduced into the reactor and dehydrogenated. The time on stream and the corresponding conversion to isoprene and selectivity to isoprene were recorded. For comparison a run was made employing no oxygen. The results are shown in Table I.

*Table I*

Catalyst: 0.44% Pd on $SiO_2$[1] ($SiO_2$ contained 0.19% $Na_2O$).
Feed: 2-methyl-2-butene.
Atmos. Press. 20/1 $N_2$/HC diluent, 0.14 WHSV.

| Volume Percent | Time on Stream, min. | WHSV | Temp., °F. | Conversion to Isoprene, Wt. percent | Selectivity to Isoprene, Wt. percent based on $C_2+$ |
|---|---|---|---|---|---|
| $O_2=0$ | 10 | 0.14 | 1,006 | 20.85 | 98.7 |
| | 46 | 0.14 | 1,006 | 8.5 | (2) |
| | 110 | 0.14 | 1,006 | 5.2 | (2) |
| $O_2=2.9$ | 20 | 0.14 | 998 | 17.9 | 99 |
| | 65 | 0.14 | 996 | 20.6 | 96.5 |
| | 90 | 0.14 | 1,014 | 17.0 | 96.0 |
| | 125 | 0.14 | 1,014 | 6.7 | (2) |

[1] Catalyst had been regenerated several times before run.
[2] Conversion too low for measurement.

The data of Table I show that in the absence of $O_2$, the activity of the catalyst decreased from 21% initially to only 8.5% at the end of 46 minutes on stream, indicating that the cycle time of the catalyst before regeneration must be kept very short. With 2.9% $O_2$ in the $N_2$ diluent stream, the activity of the catalyst was essentially constant for a period of at least 90 minutes. With suitable adjustments in the $O_2$ concentration the life of the catalyst can be maintained for even longer periods.

We claim:

1. In the dehydrogenation of aliphatic hydrocarbons of 4 to 8 carbon atoms by introduction into a reactor containing a catalyst consisting essentially of catalytic amounts of a platinum group metal on a non-acidic solid refractory support, said reactor being maintained under dehydrogenation conditions including a temperature of about 800 to 1300° F., a method of maintaining the activity of said catalyst which comprises providing in the reactor about 0.01 to 10 mole percent of oxygen.

2. The method of claim 1 wherein the non-acidic support is silica.

3. The method of claim 2 wherein the feed is a dehydrogenable aliphatic monoolefin of 4 to 8 carbons.

4. The method of claim 3 wherein the reaction is conducted at a pressure of about 0.05 to 100 p.s.i.g.

5. The method of claim 3 wherein the monoolefin feed is isoamylene.

6. The method of claim 5 wherein the platinum group metal is palladium.

References Cited in the file of this patent
UNITED STATES PATENTS

| | | |
|---|---|---|
| 2,662,861 | Riblett et al. | Dec. 15, 1953 |
| 2,864,875 | McKinley et al. | Dec. 16, 1958 |
| 2,908,656 | Hindin et al. | Oct. 13, 1959 |
| 2,909,480 | Henke | Oct. 20, 1959 |
| 2,945,900 | Alexander et al. | July 19, 1960 |